United States Patent
Boemler

(10) Patent No.: US 8,634,010 B2
(45) Date of Patent: Jan. 21, 2014

(54) REDUNDANCY IN COLUMN PARALLEL OR ROW ARCHITECTURES

(71) Applicant: Micron Technology, Inc., Boise, ID (US)

(72) Inventor: Christian Boemler, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/865,521

(22) Filed: Apr. 18, 2013

(65) Prior Publication Data

US 2013/0229559 A1 Sep. 5, 2013

Related U.S. Application Data

(60) Continuation of application No. 13/286,272, filed on Nov. 1, 2011, now Pat. No. 8,446,507, which is a continuation of application No. 12/476,757, filed on Jun. 2, 2009, now Pat. No. 8,072,523, which is a division of application No. 10/921,906, filed on Aug. 20, 2004, now Pat. No. 7,554,589.

(51) Int. Cl.
*H04N 5/335* (2011.01)
*H04N 5/217* (2011.01)
*H04N 9/64* (2006.01)
*H01L 31/113* (2006.01)
*H01L 27/00* (2006.01)

(52) U.S. Cl.
USPC ........... 348/302; 348/319; 348/241; 348/246; 257/291; 250/208.1

(58) Field of Classification Search
USPC ................ 348/302, 303, 319, 241, 300, 246; 257/291; 250/208.1; 326/10; 365/189.12, 200, 230.01
See application file for complete search history.

(56) References Cited

U.S. PATENT DOCUMENTS

| | | | |
|---|---|---|---|
| 5,227,997 A | 7/1993 | Kikuda et al. | |
| 5,231,604 A * | 7/1993 | Watanabe | 365/189.12 |
| 5,566,124 A | 10/1996 | Fudeyasu et al. | |
| 6,285,360 B1 | 9/2001 | Li | |
| 6,314,033 B1 * | 11/2001 | Sugamoto et al. | 365/200 |
| 6,518,945 B1 | 2/2003 | Pinkham | |
| 6,556,479 B2 | 4/2003 | Makuta et al. | |
| 6,803,782 B2 * | 10/2004 | Koob et al. | 365/200 |
| 6,920,078 B2 | 7/2005 | Cho | |
| 6,928,535 B2 | 8/2005 | Yamashita et al. | |
| 7,002,628 B1 | 2/2006 | Panicacci | |
| 7,023,031 B2 | 4/2006 | Tsai | |
| 7,372,493 B2 | 5/2008 | Panicacci | |
| 2002/0001896 A1 | 1/2002 | Yoon | |
| 2002/0017666 A1 * | 2/2002 | Ishii et al. | 257/291 |
| 2002/0186589 A1 | 12/2002 | Makuta et al. | |
| 2003/0076431 A1 | 4/2003 | Krymski | |

(Continued)

*Primary Examiner* — Nhan T Tran
(74) *Attorney, Agent, or Firm* — Dickstein Shapiro LLP

(57) ABSTRACT

A column circuitry architecture for an imager includes redundant column or row circuits. The column or row circuitry includes a number of redundant column or row circuits. Each column or row circuit include circuitry for controllably coupling the column or row circuit to one of plural signal lines from an array of pixels. A control mechanism is used to select a configuration of plural column or row circuits in the column or row circuitry. In this manner, some column or row circuits are decoupled from the pixel in favor of other column or row circuits. The decoupled column or row circuits may include defective or noisy circuits.

29 Claims, 12 Drawing Sheets

(56) References Cited

U.S. PATENT DOCUMENTS

| | | |
|---|---|---|
| 2003/0146991 A1 | 8/2003 | Barna et al. |
| 2003/0193594 A1 | 10/2003 | Tay |
| 2004/0239789 A1 | 12/2004 | Bruce et al. |
| 2005/0237846 A1 | 10/2005 | Cho |
| 2006/0097132 A1 | 5/2006 | Nam |
| 2006/0125940 A1* | 6/2006 | Tinkler et al. .................. 348/294 |
| 2006/0158540 A1 | 7/2006 | Murakami et al. |
| 2006/0246619 A1 | 11/2006 | Imamura |

* cited by examiner

REDUNDANCY IN COLUMN PARALLEL OR ROW ARCHITECTURES

This application is a continuation of application Ser. No. 13/286,272, filed Nov. 1, 2011, which is a continuation of application Ser. No. 12/476,757, filed Jun. 2, 2009, now U.S. Pat. No. 8,072,523, which is a divisional of application Ser. No. 10/921,906, filed Aug. 20, 2004, now U.S. Pat. No. 7,554,589, which are hereby incorporated by reference in their entireties.

FIELD OF INVENTION

The present invention relates generally to pixel architectures for semiconductor imagers. More specifically, the present invention relates to the use of redundancy in column or row circuitry.

BACKGROUND OF THE INVENTION

FIG. 1 is an illustration of a conventional four transistor (4T) imaging pixel 100. The imaging pixel 100 includes a light sensitive element 101, shown as a photodiode, a floating diffusion node C, and four transistors: a transfer transistor 111, a reset transistor 112, a first source follower transistor 113, and a row select transistor 114. The imaging pixel 100 accepts a TX control signal for controlling the conductivity of the transfer transistor 111, a RST control signal for controlling the conductivity of the reset transistor 112, and a ROW control signal for controlling the conductivity of the row select transistor 114. The voltage at the floating diffusion node C controls the conductivity of the first source follower transistor 113. The output of the source follow transistor is presented to the load circuit 120 through the row select transistor 114, which outputs a pixel signal at node B, when the row select transistor 114 is conducting. The output at node B may be routed to column circuitry 220 (FIG. 2) of an imager 200, as discussed in greater detail below.

The states of the transfer and reset transistors 111, 112 are used to determine whether the floating diffusion node C is coupled to the light sensitive element 101 for receiving a photo generated charge as generated by the light sensitive element 101 during a charge integration period or a source of pixel power VAAPIX at node A during a reset period.

The imaging pixel 100 is operated as follows. The ROW control signal is asserted to cause the row select transistor 114 to conduct. At the same time, the RST control signal is asserted while the TX control signal is not asserted. This couples the floating diffusion node C to the pixel power VAAPIX at node A, and resets the voltage at node C to the pixel power VAAPIX. The imaging pixel 100 outputs a reset signal Vrst at node B.

After the reset signal Vrst has been output, the RST control signal is deasserted. The light sensitive element 101 is exposed to incident light and accumulates charges based on the level of the incident light during a charge integration period. After the charge integration period, the TX control signal is asserted. This couples the floating diffusion node C to the light sensitive element 101. Charge flows through the transfer transistor 111 and diminishes the voltage at the floating diffusion node C. The imaging pixel 100 outputs a photo signal Vsig at node B. The reset and photo signals Vrst, Vsig are different components of the overall pixel output (i.e., Voutput=Vrst−Vsig).

FIGS. 2A and 2B are illustrations of an imager 200. The imager 200 includes a pixel array 201 comprising a plurality of imaging pixels 100 organized into rows and columns in an imaging portion 201b of the pixel array 201. The pixel array 201 may also include a non-imaging portion 201a, which comprises a plurality of non-imaging pixels 100', for example, barrier pixels or dark pixels. Non-imaging pixels 100' are similar to imaging pixels, but do not produce outputs which are further processed by the imager 200.

The imager 200 also includes row circuitry 210, column circuitry 220, an analog-to-digital converter 230, a digital processing circuit 240, and a storage device 250. The imager 200 also includes a controller 260. The row circuitry 210 selects a row of pixels 100 from the pixel array 201. The imaging pixels 100 in the selected row output their reset and pixel signals Vrst, Vsig to the column circuitry 220, which samples and holds the reset and pixel signals Vrst, Vsig. The column circuitry 220 also forms the pixel output (Vrst−Vsig), which is presented to the analog-to-digital converter 230 that converts the difference signal to a digital value. The digital value is then processed by the digital processing circuit 240, which stores the processed value in the storage device 250 for output. The controller 260 is coupled to the pixel array 201, row circuitry 210, column circuitry 220, digital processing circuit 240, and storage device 250, and provides control signals to perform the above described processing.

As shown in FIG. 2B, the column circuitry 220 may employ a column parallel analog to digital architecture, which includes a plurality of column circuits 221 for receiving, in parallel, a plurality of reset and photo signals Vrst, Vsig from a plurality of imaging pixels 100 in a selected row. Each column circuit 221 samples and holds the reset and photo signals Vrst, Vsig as they are received and converts each sampled signal Vrst, Vsig into a digital code proportional to the difference between signals Vrst and Vsig. The digital code is typically stored in a column memory, which can be sequentially selected to preset the stored digital code to digital processing 240. The analog to digital converters can be any type of converter, including, for example, SAR, single slope, dual slope, cyclic 1.5 bit, or other types of converters. Although the non-imaging pixels 100' of the selected row do not produce signals that are subsequently processed by the imager 200, typically the column circuitry includes column circuits 221 corresponding to both the imaging and non-imaging pixels 100, 100' of the selected row.

The imager 200 may be partially or wholly formed upon an integrated circuit. For example, the pixel array 201, row circuitry 210, column circuitry 220, analog to digital converter 230, and digital processing circuit 240 may be incorporated into an integrated circuit. Portions of an integrated circuit, however, might be formed with defects. For example, when the column circuitry 220 is incorporated into an integrated circuit, some of the column circuits 221 may be defective, which may normally require rejecting that integrated circuit. Similarly, the row circuitry 210 may also include defects, which may also require rejecting the integrated circuit.

Additionally, as the photo and reset signals Vrst, Vsig are routed through the column circuitry 220, they are subject to noise. One type of noise is known as column fixed pattern noise (FPN). Column FPN is associated with the characteristics of the column circuit 221 that the reset and photo signals Vrst, Vsig travel through. Thus, even when each column circuit 221 is non-defective, some column circuits 221 may be associated with a higher level of column FPN than others.

Accordingly, there is a need and desire for an improved column circuitry architecture that is less susceptible to column FPN and which can tolerate defects. There is also a need and desire for an improved row circuitry architecture that can tolerate defects.

SUMMARY OF THE INVENTION

Exemplary embodiments of the present invention provide an imager with a column or row circuitry architecture that includes redundant column or row circuits. Each column or row circuit includes circuitry for controllably coupling the column or row circuit to one of plural signal lines from a pixel array. A control mechanism is used to select a configuration of plural column or row circuits in the column or row circuitry. In this manner specified column or row circuits, for example, defective or noisy column circuits, or defective row circuits, can be decoupled from the pixels in favor of other column or row circuits.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 3:
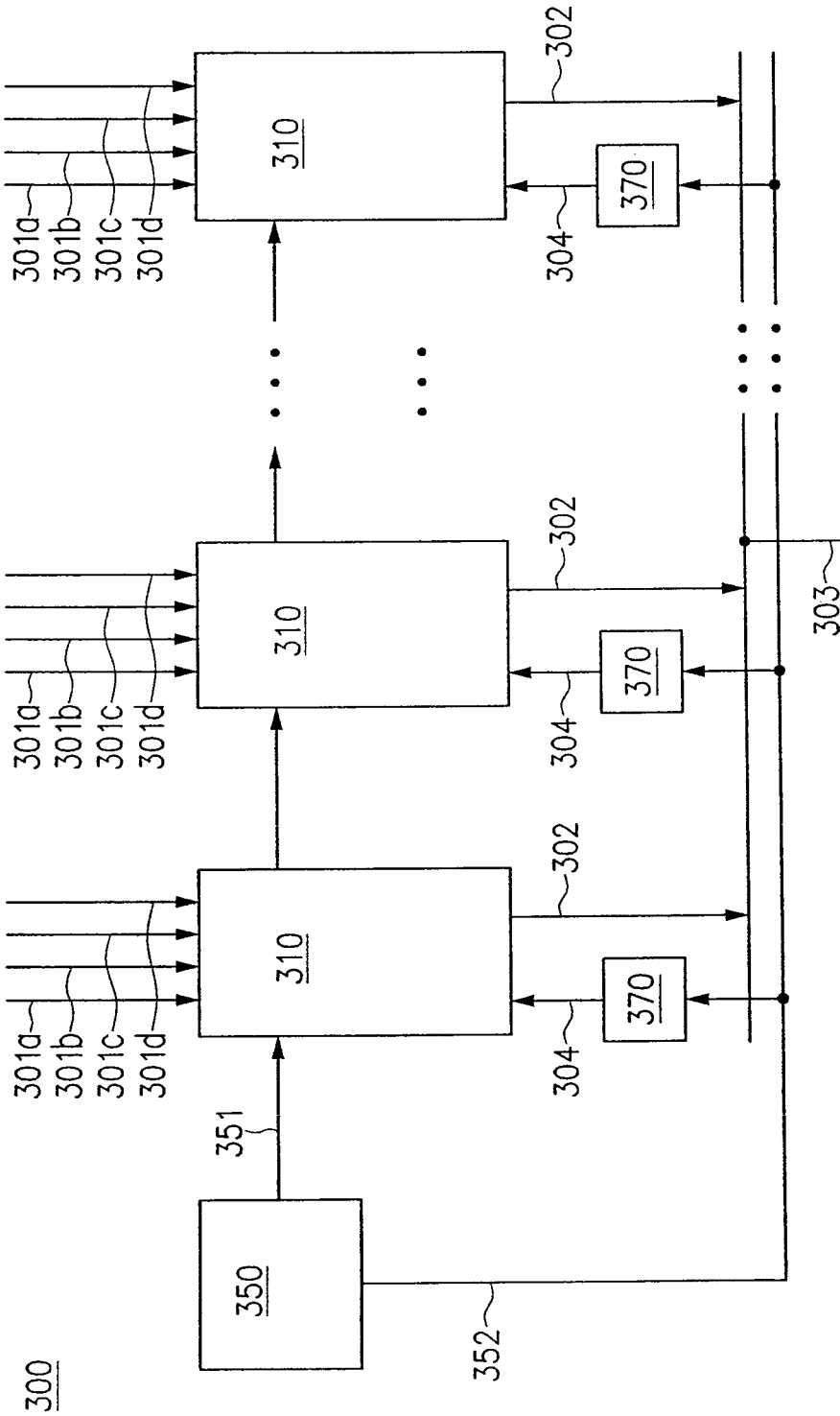
FIG. 3 illustrates column circuitry for an imager in accordance with the present invention.

Now referring to the drawings, where like reference numerals designate like elements, there is shown in FIG. 3 column circuitry 300 in accordance with one exemplary embodiment of the present invention.

Figure 1:
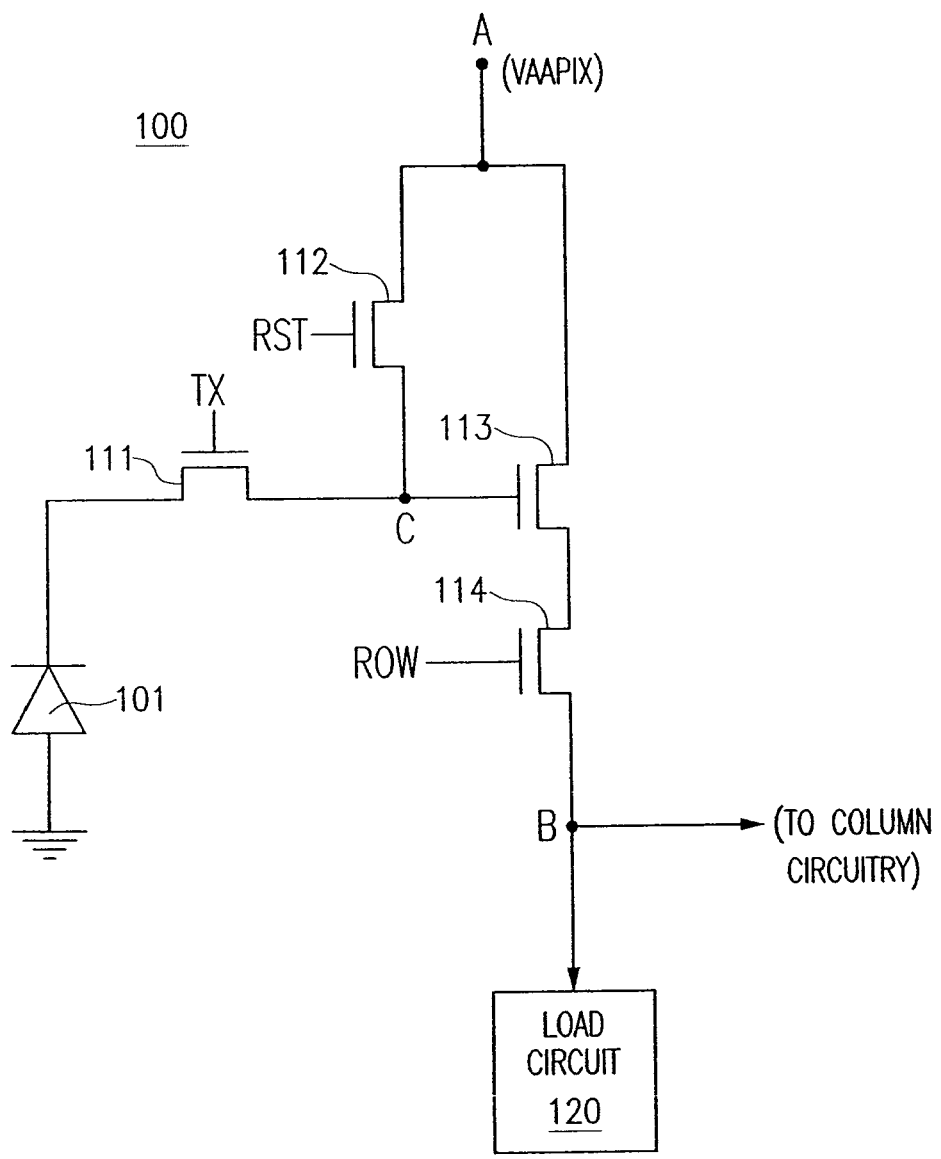
FIG. 1 illustrates a conventional pixel.
Figure 2A:
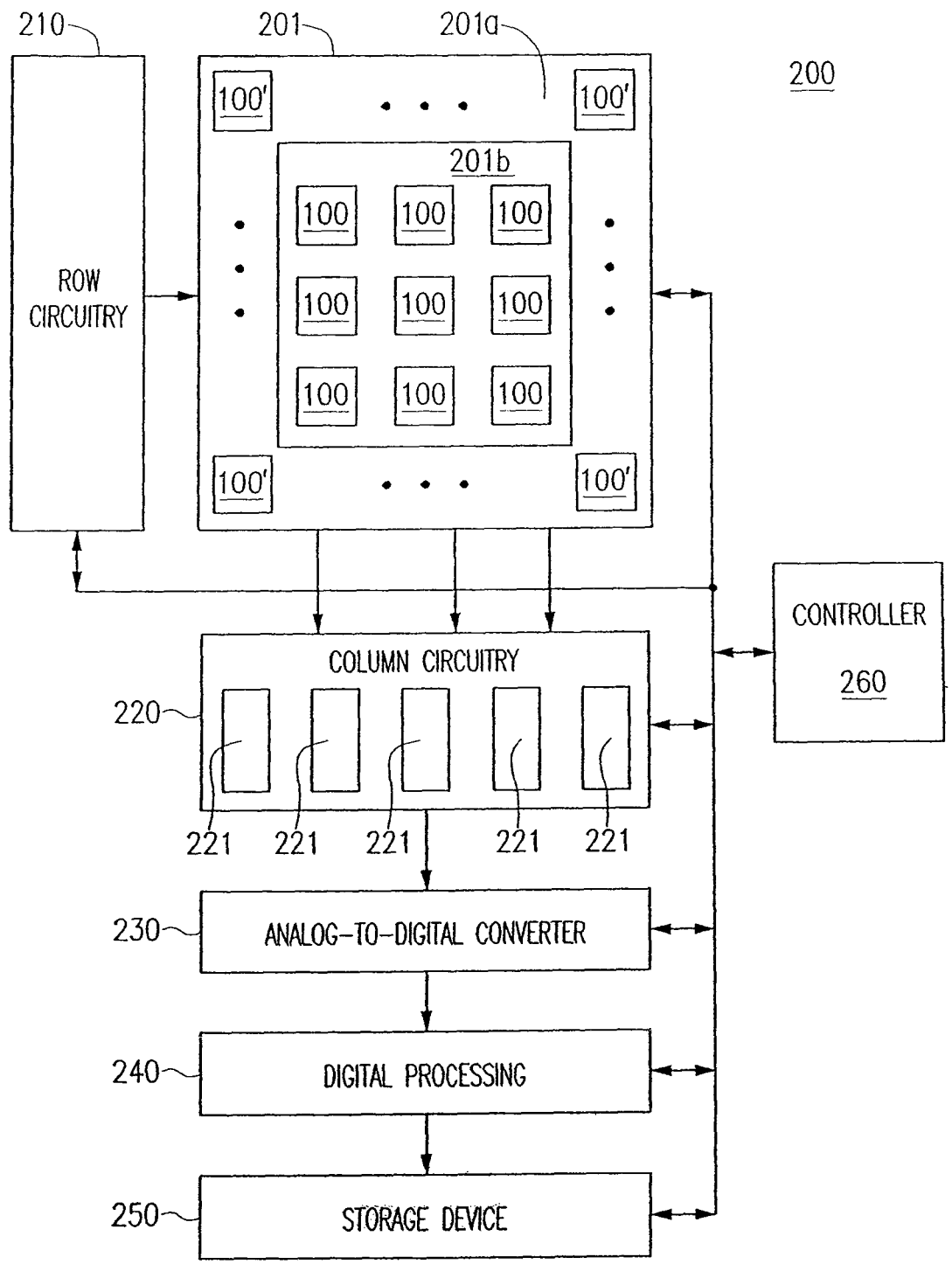
FIG. 2A illustrates an imager.
Figure 2B:
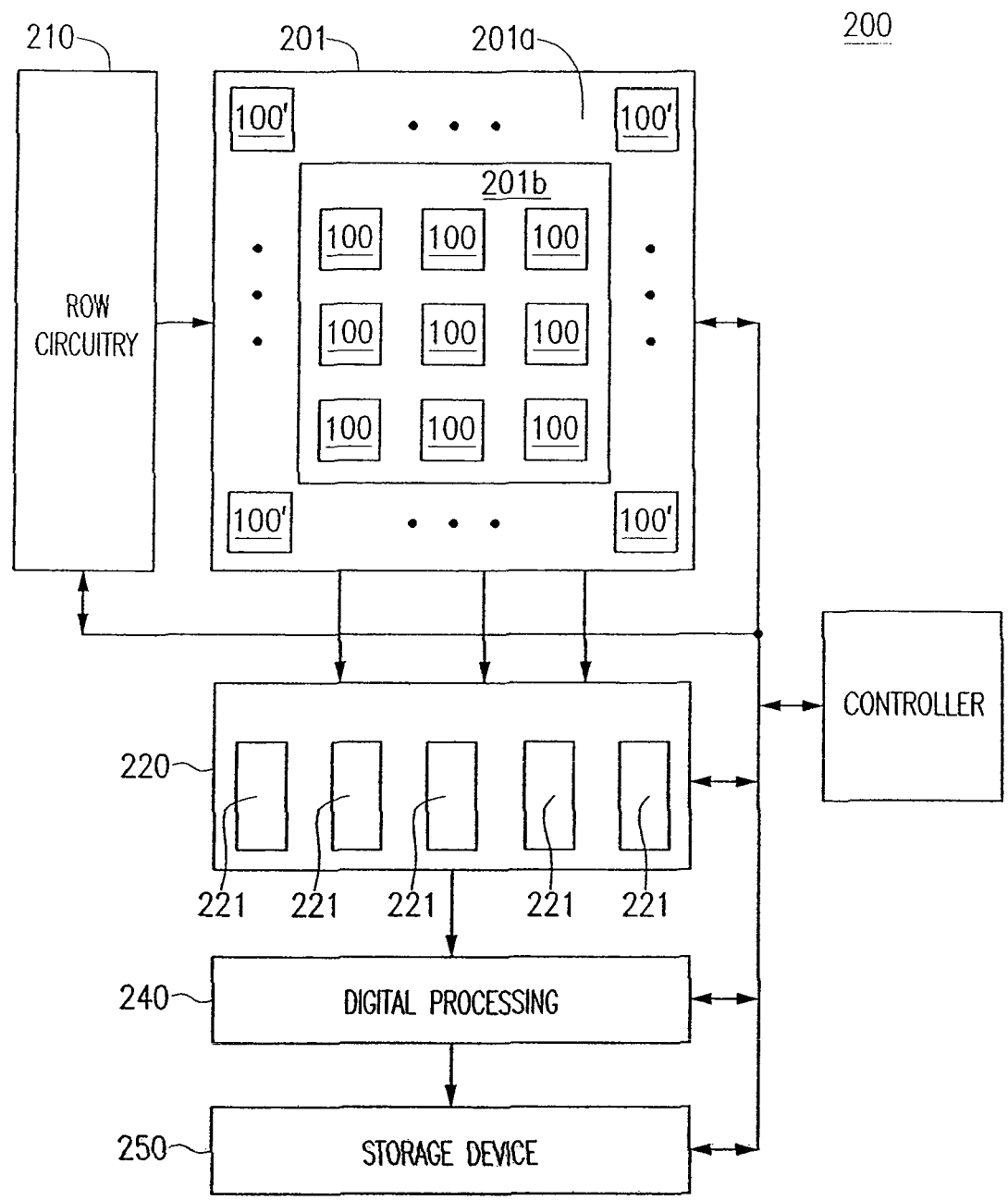
FIG. 2B illustrates an imager with a column-parallel analog to digital conversion architecture.

Referring also to FIGS. 2A and 2B, the column circuitry 300 illustrated in FIG. 3 may be substituted for the conventional column circuitry 220 in imager 200. In FIG. 3, the column circuitry 300 is shown as comprising a plurality of column circuits 310. Each column circuit 310 accepts a plurality of input signal lines 301a, 301b, 301c, 301d. Each input signal line 301a, 301b, 301c, 301d is coupled to the output node B of a respective imaging pixel 100 of the pixel array 201 (FIG. 2A or 2B) in an imager 200 (FIG. 2A or 2B). As described in greater detail below with reference to FIGS. 4-5, each column circuit 310 is adapted to be controllably coupled to one of plural pixel output nodes B.

Each column circuit 310 also outputs a signal via an output line 302. In one exemplary embodiment of the invention, the output lines 302 of each column circuit 310 are coupled in parallel to an output line 303, which may be coupled, for example, to an input of an analog to digital converter 230 (FIG. 2A) or digital processing circuit 240 (FIG. 2B). As will be described in greater detail below with reference to FIGS. 4 and 6, each column circuit 310 also accepts a first control input 351 and a second control input 304. More specifically, the first control input 351 is generated by a control circuit 350, and the second control input 304 is generated by column decoder 370 from another control input 352 generated by the control circuit 350. Control circuit 350 is discussed in greater detail below with reference to FIG. 6.

As previously noted, the column circuitry 300 of the invention includes a plurality of column circuits 310 and each column circuit 310 is adapted to be controllably coupled to the output node B of one of the plurality of imaging pixels 100. As illustrated in FIG. 3, each column circuit 310 can be coupled to the output node B of one imaging pixel 100 chosen from a set of four imaging pixels. However, it should be recognized that the invention may be practiced using a different number of pixels. The number of column circuits 310 in the column circuitry 300 is preferably greater than the number of columns of imaging pixels 100 in the pixel array 201 (FIG. 2A or 2B). In one exemplary embodiment, the number of column circuits 310 corresponds to the total number of columns in the pixel array 201 (FIG. 2A or 2B). That is, the number of column circuits 310 corresponds to the sum of the number of imaging pixels 100 and the number of non-imaging pixels 100' in one row of the pixel array 201. However, it should be recognized that the invention may be practiced using a different ratio of column circuits 310 to imaging pixels 100, as long as there are more column circuits 310 than the number of imaging pixels 100 in one row of the pixel array 201. By providing more column circuits 310 than the number of imaging pixels 100 in one row of the pixel array 201, when there are any defective or noisy column circuits 310 in the column circuitry 300, the defective or noisy column circuit 310 can be bypassed and another one of the column circuits 310 that is not defective and not noisy can be configured to process signals from the output node B of an imaging pixel (which in a conventional imager would have been processed by the defective or noisy column circuit 221).

Figure 4:
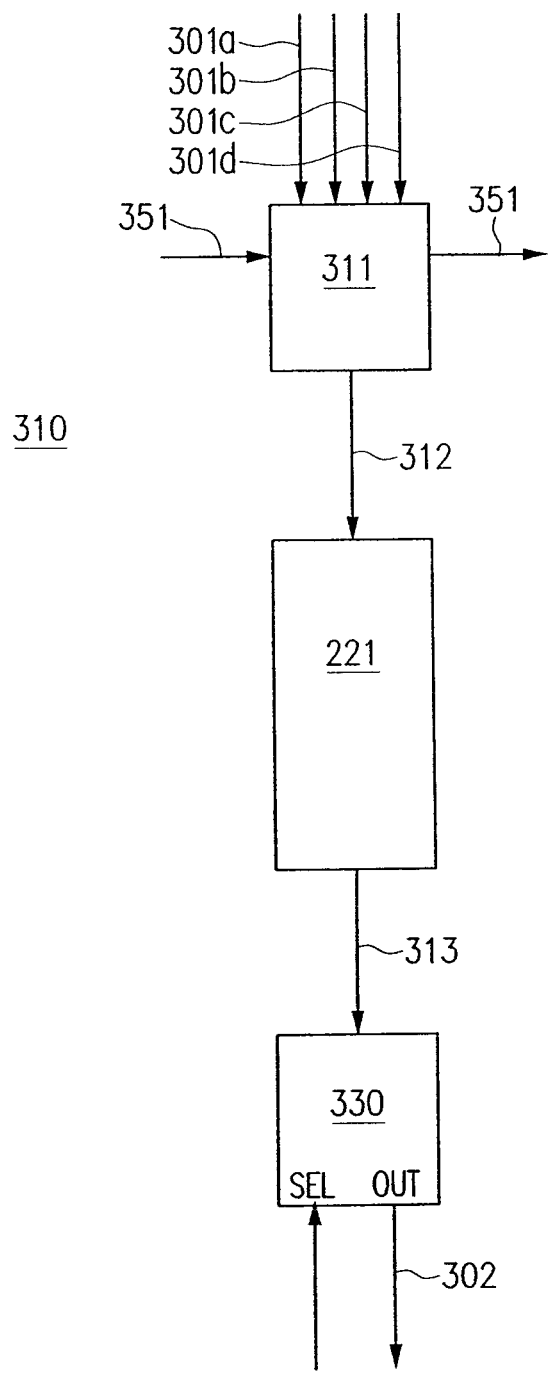
FIG. 4 illustrates a column circuit of the FIG. 3 column circuitry.

FIG. 4 is a more detailed illustration of one of the column circuits 310 in the column circuitry 300. Each column circuit 310 includes a selection circuit 311, an output circuit 330, and a conventional column circuit 221.

Figure 5:
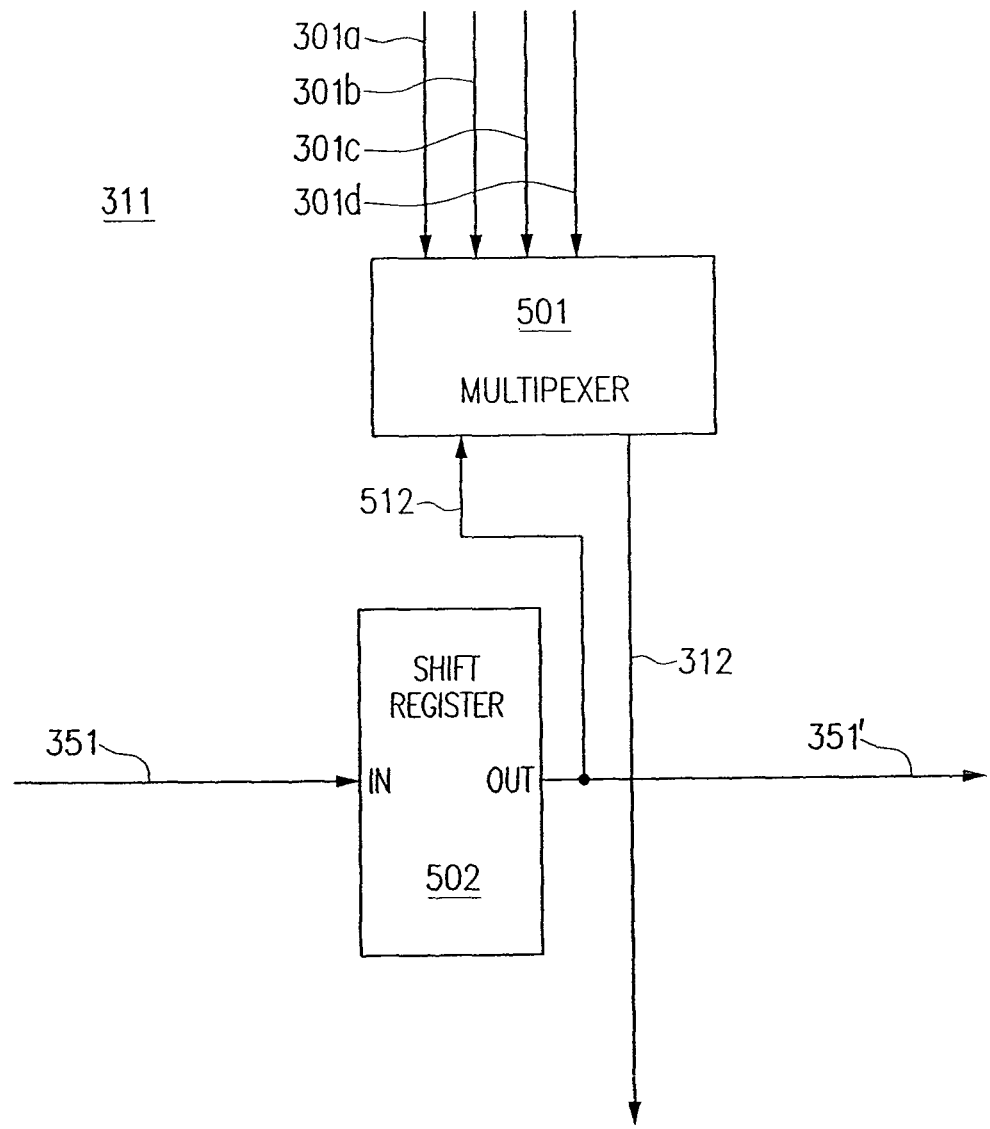
FIG. 5 illustrates a selection circuit of the column circuit of FIG. 4.

Referring now to FIG. 5, the selection circuit 311 includes a multiplexer 501, which receives pixel signals from the output node B of a respective plurality of imaging pixels 100 on signal lines 301a, 301b, 301c, and 301d. The selection circuit 311 also includes a shift register 502. The shift register 502 preferably has an input IN and an output OUT. The input IN and the output OUT are coupled in series between different segments of control line 351 to permit data appearing on line 351 to be sequentially shifted between shift registers 502 of adjacent column circuits 310 through line 351'. The output OUT of the shift register 502 is also routed from line 351' to a input select terminal of the multiplexer 501. In this manner, the input from the line 351 is shifted through the shift register 502, which controls which one of the signals from lines 301a, 301b, 301c, and 301d is coupled by the multiplexer 501 to line 312.

As shown in FIG. 4, the conventional column circuit 221 is coupled in series between the selection circuit 311 and the output circuit 330 respectively via lines 312 and 313. The conventional column circuit 211 may include, for example, sample and hold circuits for sampling and holding rest and photo signals Vrst, Vsig from imaging pixels 100. The output of the conventional column circuit 211 is supplied to the output circuit 330 via line 313.

Figure 6:
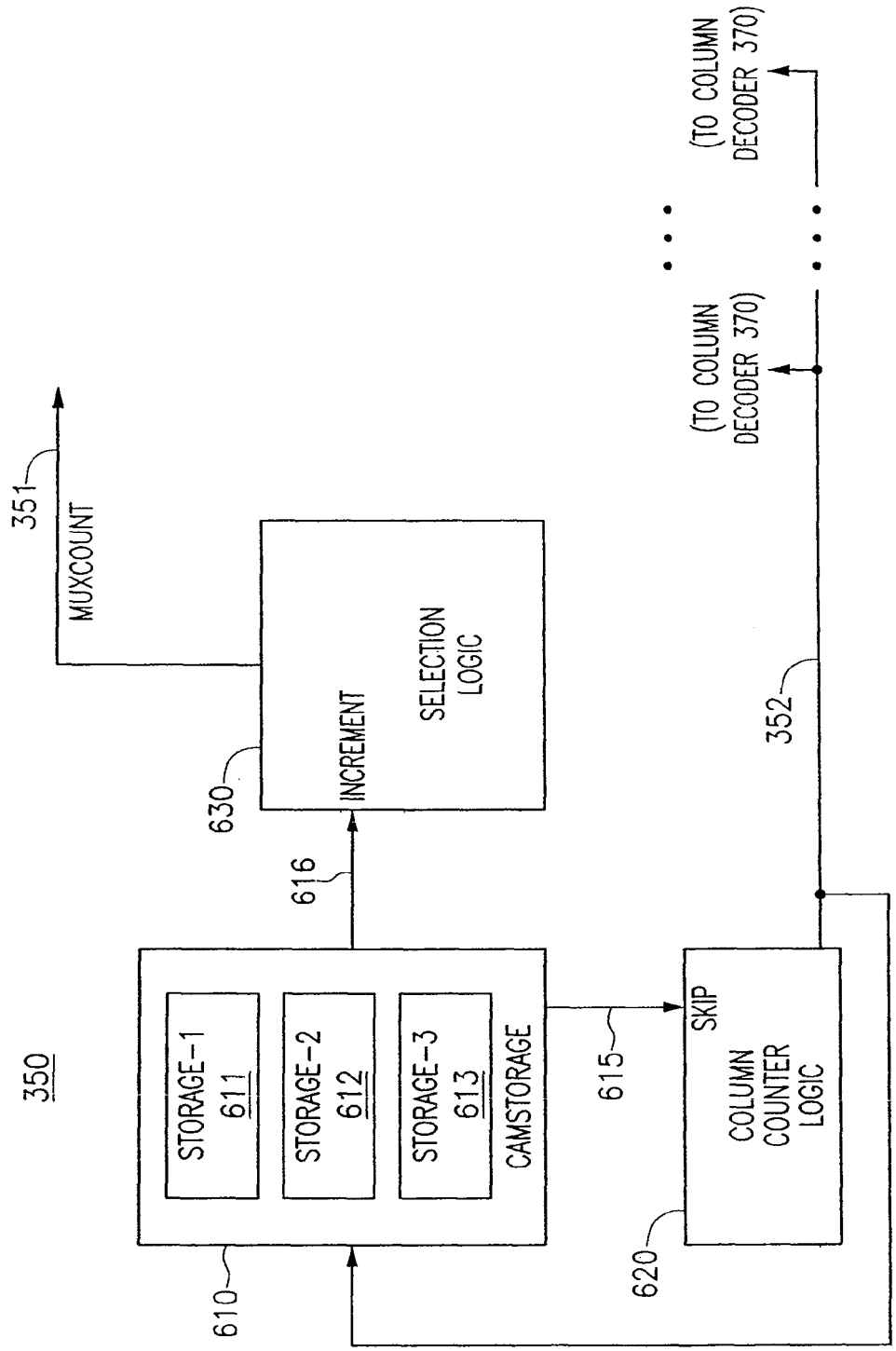
FIG. 6 illustrates a control circuit of the FIG. 3 column circuitry.

The output circuit 330 accepts a control input SEL via line 304, which as shown in the exemplary embodiment illustrated in FIG. 3 is coupled to one of control lines 352. The output circuit 330 is therefore coupled to the control circuit 350 (FIGS. 3 and 6). The control circuit 350 can control whether the output circuit 330 couples the signal on line 313 to the output line 302. The control circuit 350 can thereby sequentially toggle the state of the SEL control signal for each of the column circuits 310 is being used to conduct pixel signals in the column circuitry 300. The control circuit 350 is also adapted to deassert and not toggle the SEL control signals corresponding to defective or noisy column circuits 310. In this manner, only the signals associated with non-defective and non-noisy column circuits 310 are coupled (e.g., sequentially) to 303 and further processed by the imager 200 (FIG. 2A or 2B), for example, by the analog to digital converter 230 (FIG. 2A).

FIG. 6 is a more detailed illustration of the control circuit 350. The control circuit 350 includes a storage device 610, column counter logic 620, and selection logic 630. The storage device 610 includes a plurality of storage locations 611, 612, 613. In one exemplary embodiment, the storage device 610 is a plurality of fuse settable registers 611, 612, 613. However, the invention may be practiced using different forms of storage locations, for example, anti-fuses, memory locations, and the storage device 610 may be a non-volatile memory device, such as a flash memory or an EPROM/EEPROM preferably in a CAM configuration. In one exemplary embodiment, the number of storage locations in the storage device 610 is one less than the number of pixel signal inputs 301a, 301b, 301c, 301d supplied to each column circuit 310. The plurality of storage locations are set to store column addresses corresponding to defective, noisy, or unused column circuits 310. The storage device 610 is coupled to the column counter logic 620 and the selection logic 630.

The column counter logic 620 is a counter that generates a sequence of column addresses on control line 352. The column counter logic 620 receives on input SKIP the addresses from storage locations 611, 612, 613. The column counter logic 620 is configured to operate in one of two modes. As described below in greater detail in connection with FIG. 7, the column counter logic 620 is operable in a start-up mode in which the column counter logic 620 sequentially counts through each column address. After start-up, the column counter logic 620 operates in a normal mode where it is configured to sequentially count through each column address, unless a column address also corresponds to an address stored in the storage locations 611, 612, 613 of the storage device 610. If the column address corresponds to one of the addresses stored in the storage device 610, that address is skipped. The control line 352 that outputs the column addresses is coupled to the selection logic 630, and is also supplied to each column decoder 370 (FIG. 3).

The selection logic 630 operates during the start-up mode to set a configuration of the multiplexers 501 (FIG. 5) in each of the column circuits 310 (FIG. 3). The selection logic 630 receives, on line 616, the increment signal received by the storage device 610. When the column address is equal to either one of the stored column locations 611, 612, 613, the MUXCOUNT parameter is incremented. As previously discussed in connection with FIG. 5, these MUXCOUNT parameters are used to control the input selected by the multiplexer 501 of the selection circuit 311.

Figure 7:
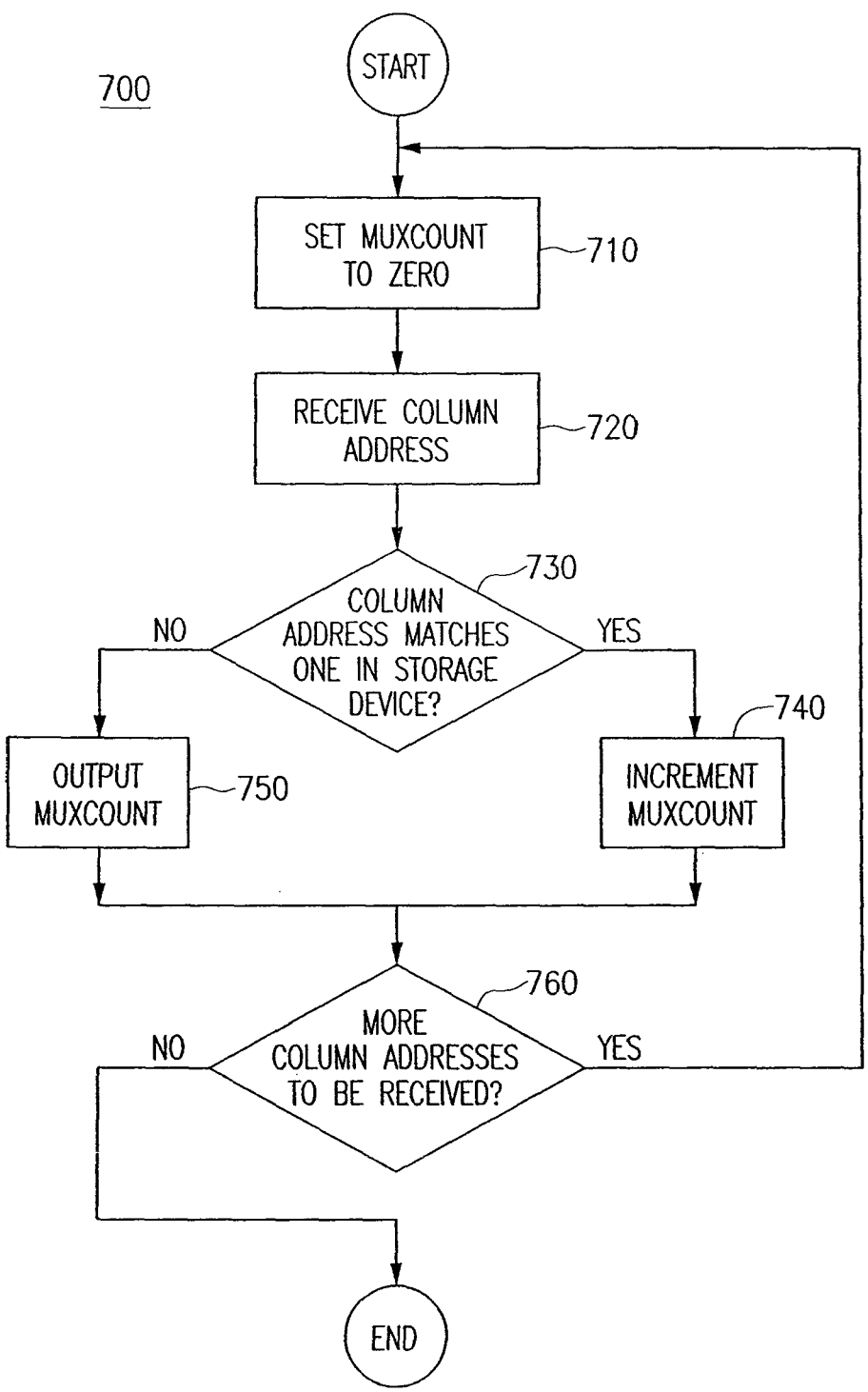
FIG. 7 is a flowchart illustrating exemplary processing performed by the control circuit.

FIG. 7 is a flowchart describing the processing 700 performed by the selection logic 630. The first step 710 of the processing is to set an internal value for the MUXCOUNT parameter to zero. Processing continues at step 720, where a new column address is received on line 352 from the column counter logic 620. Processing continues at step 730, which determines whether the received column address corresponds to any of the column addresses stored in storage locations 611, 612, 613. If so, processing continues at step 740 by incrementing the internal value of MUXCOUNT. If not, processing continues at step 750 and the internal value of MUXCOUNT is output on line 351. After either step 740 or 750, processing continues at step 760, by determining whether the column counter logic 620 will continue to output more column addresses. If so, processing starts again at step 710. If not, all column addresses have been output and processing terminates. At this point, the start-up procedure is over and normal operations can begin.

Figure 8:
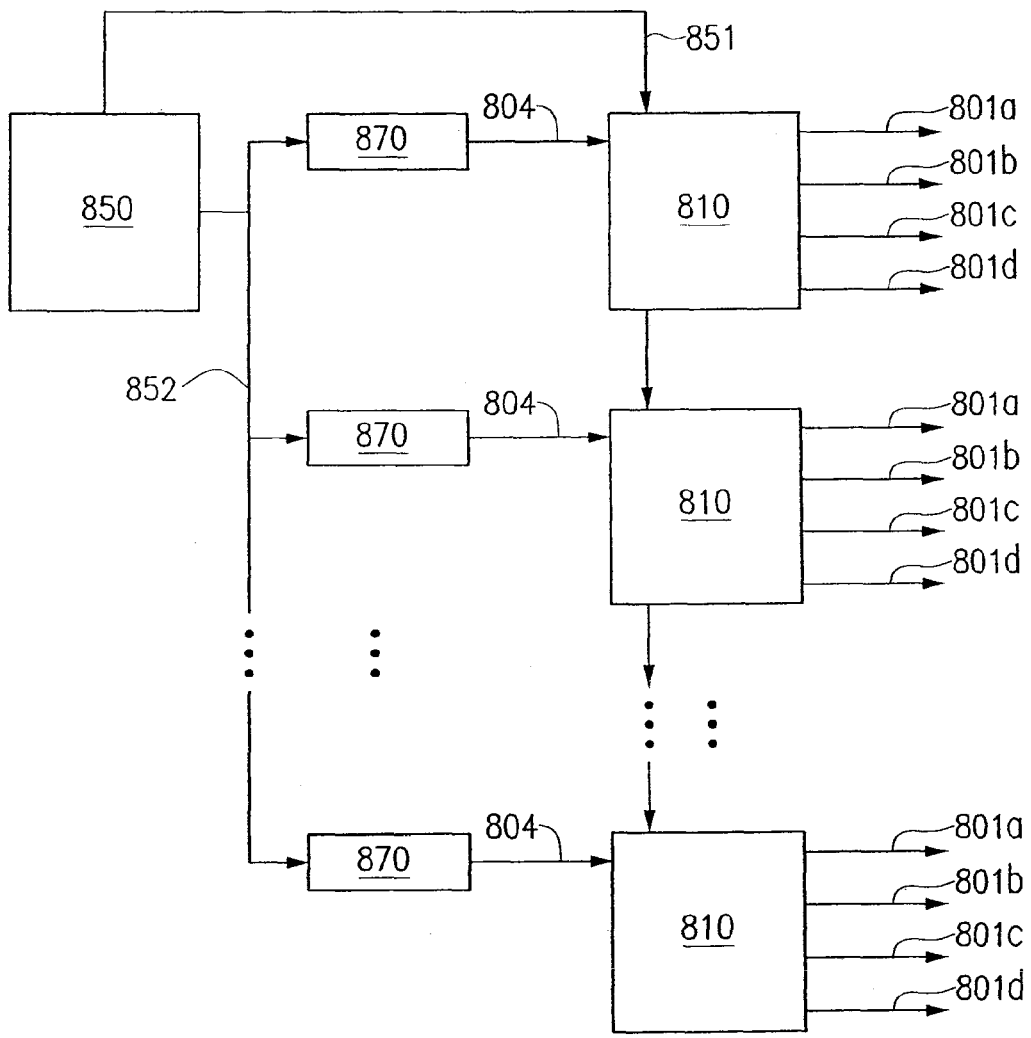
FIG. 8 is an illustration of row circuitry in accordance with the principles of the present invention.

The principles of the present invention may also be applied to row circuitry. FIG. 8 is an illustration of row circuitry 800 that may replace row circuitry 210 (FIG. 2A or 2B) in the imager 200 (FIG. 2A or 2B).

In FIG. 8, the row circuitry 800 comprises a plurality of row circuits 810. Each row circuit 810 is shown as including a plurality of row driver output lines 801a, 801b, 801c, 801d. The row driver output lines are each coupled to a different one of a plurality of rows in the pixel array 201 (FIG. 2A or 2B). Each row circuit 810 outputs one row driver signal on one of the plurality of row driver output lines 801a, 801b, 801c, 801d.

The row circuitry 800 also includes a row control circuit 850, which outputs control signals on control lines 851 and 852. More specifically, during start-up a sequence of row addresses are output on line 851 to configure each of the row circuits 810. During normal operation, a sequence of row addresses are output on line 852. Each row circuit 810 is associated with a row decoder 870, which is coupled in series between the control line 852 and the associated row circuit 810.

Figure 9:
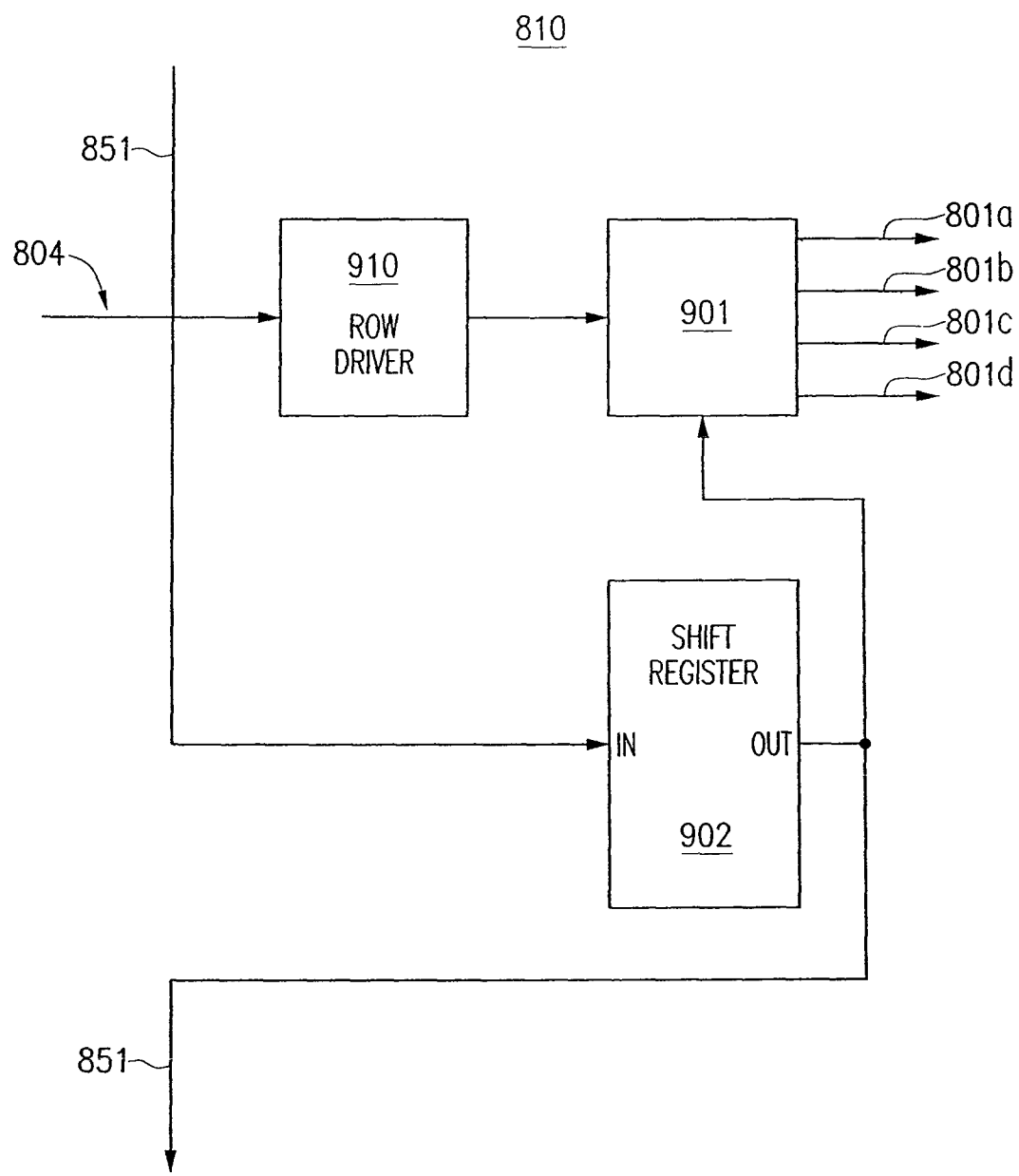
FIG. 9 is an illustration of a row circuit for the FIG. 8 row circuitry.

FIG. 9 is a more detailed illustration of one of the row circuits 810. The row circuit 810 includes a row driver 910 that receives the output of an associated row decoder 870 on line 804. The row driver 910 generates a row driving signal, which is supplied to a demultiplexer 901. The demultiplexer 901 outputs the row driving signal on one of output lines 801a, 801b, 801c, 801d based on the a selection parameter received from a shift register 902. The shift register 902 includes an input IN and an output OUT. The input IN receives a selection parameter from an incoming segment of line 851. The output OUT is coupled to an outgoing segment of line 851 and the selection control node of the demultiplexer 901. In this manner a selection parameter can be shifted through the shift register 902 and that selection parameter can be used to configure the state of the demultiplexer 901.

Figure 10:
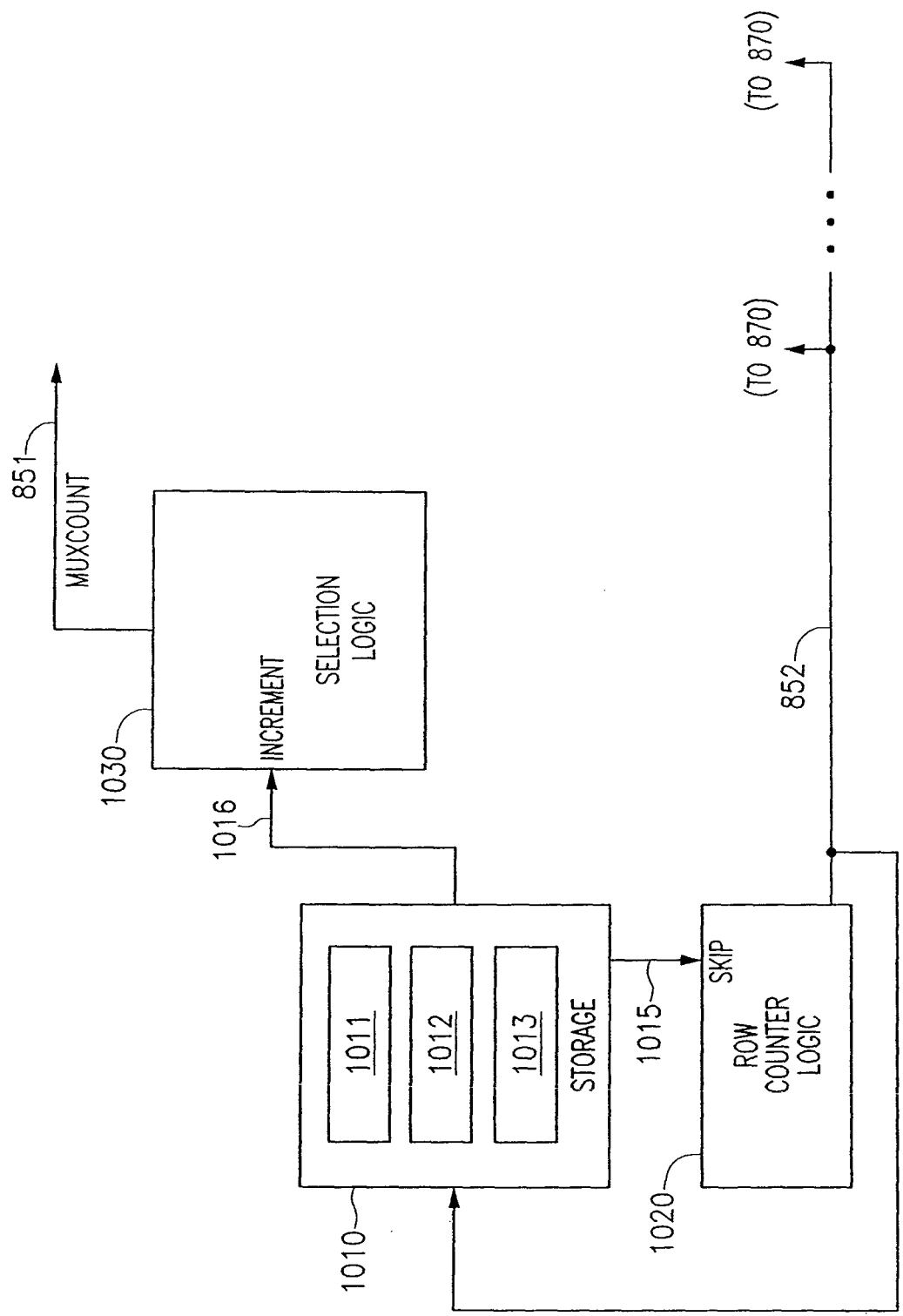
FIG. 10 is an illustration of a control circuit for the FIG. 8 row circuitry.

FIG. 10 is a more detailed illustration of the control circuit 850 (FIG. 8). The control circuit 850 is similar in component and principles of operation to control circuit 350 (FIG. 6). The control circuit 850 includes a storage device 1010 having storage locations 1011, 1012, 1013 coupled via line 1015 to a skip terminal SKIP of row counter logic 1020 and via line 1016 an increment terminal of selection logic 1030. The row counter logic 1020 operates in the same manner as the column counter logic 620, except the addresses the row counter logic 1020 supplies are row addresses instead of column addresses. The selection logic 1030 performs the same processing 700 (FIG. 7) during a start-up mode except it operates on row addresses instead of column addresses.

Figure 11:
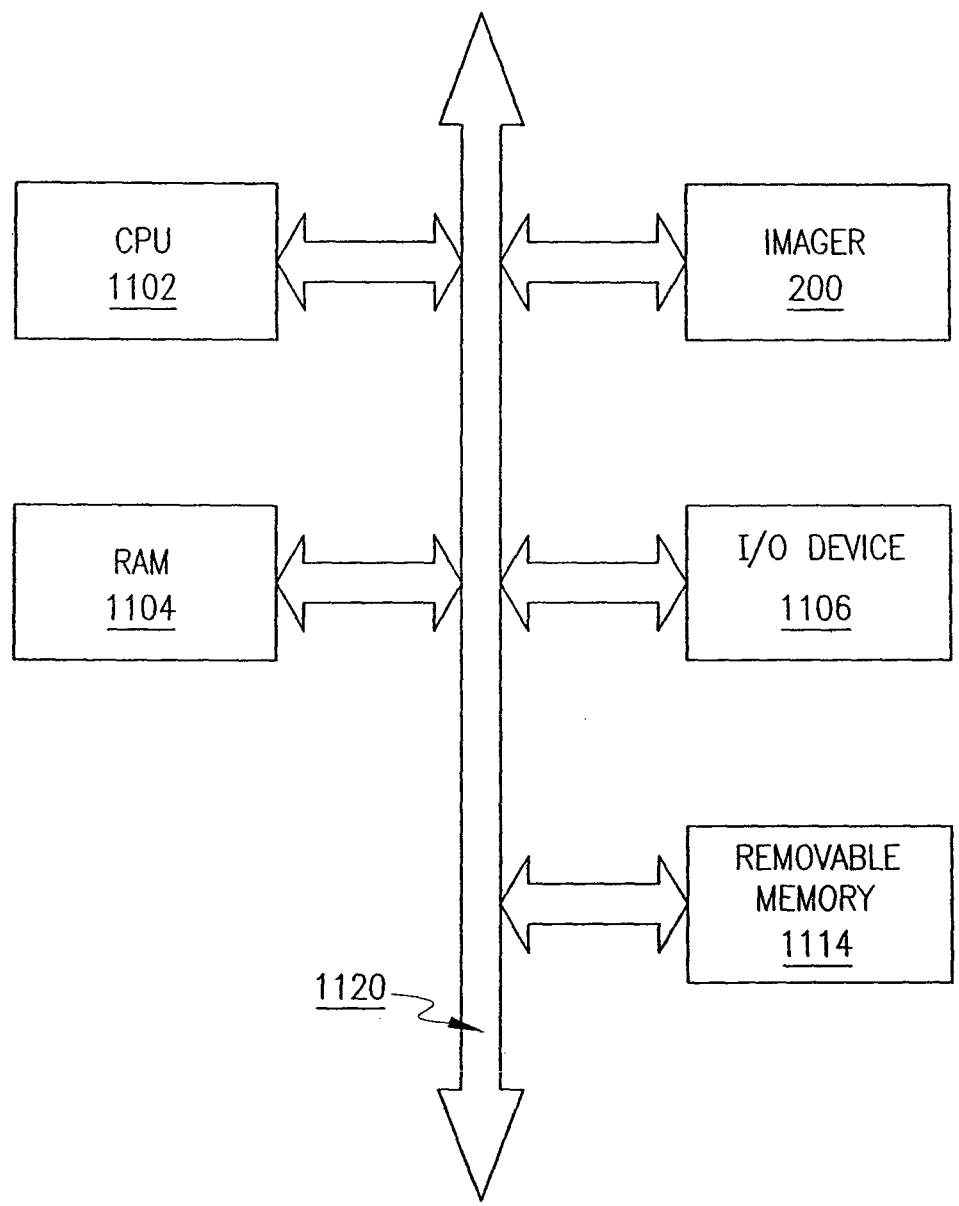
FIG. 11 is a system incorporating the row and column circuitry of the present invention.

FIG. 11 shows system 1100, a typical processor system modified to include an imager 200 with the column circuitry 300 (FIG. 3) or row circuitry 800 (FIG. 8) of the present invention. The system 1100 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 1100, for example a camera system, generally comprises a central processing unit (CPU) 1102, such as a microprocessor, that communicates with an input/output (I/O) device 1106 over a bus 1120. Imaging device 200 also communicates with the CPU 1102 over the bus 1120. The system 1100 also includes random access memory (RAM) 1104, and can include removable memory 1114, such as flash memory, which also communicate with the CPU 1102 over the bus 1120. The imager 200 may be combined with a processor, such as a CPU, digital signal processor, or microprocessor, with or without memory storage on a single integrated circuit or on a different chip than the processor.

It should be appreciated that other embodiments of the invention include a method of manufacturing the column circuitry or row circuitry of the invention. For example, in one exemplary embodiment, a method of manufacturing the column or row circuitry includes the steps of providing the selection circuit, output circuit, and control circuit of the column or row circuitry. In addition, the imager 200 (FIG. 2A or 2B), when incorporating the row or column circuitry of the present invention can be fabricated as part of an integrated circuit fabrication method using known fabrication techniques.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. An imager comprising:
    a pixel array containing a plurality of imaging pixels arranged in rows and columns;
    a plurality of column circuits, the number of column circuits being greater than the number of imaging pixels arranged in a row;
    a storage device for storing addresses of column circuits which should be bypassed; and
    a control circuit for selecting and operating the plurality of column circuits such that the imaging pixels in each row are coupled to a column circuit which has no address stored in the storage device during readout of an image captured by the imaging pixels in the pixel array.

2. An imager as in claim 1, wherein each column circuit is associated with a plurality of imaging pixels of a row, each column circuit being selectively connectable to one of the associated imaging pixels.

3. An imager as in claim 2, further comprising:
    a plurality of selection circuits respectively coupled to the plurality of pixel circuits each selection circuit selectively connecting an associated pixel circuit to one of its associated imaging pixels.

4. An imager as in claim 3, wherein each selection circuit comprises a multiplexer.

5. An imager as in claim 1, wherein the pixel array further comprises non-imaging pixels.

6. An imager as in claim 5, wherein the non-imaging pixels are arranged in at least one column of the pixel array.

7. An imager as in claim 5, wherein the non-imaging pixels are arranged in at least one row of the array.

8. An imager as in claim 1, wherein the pixel array includes at least one additional column of non-imaging pixels and the number of column circuits equals the number of columns in the pixel array.

9. An imager as in claim 1, wherein the column circuits which should be bypassed include one or more of defective column circuits, noisy column circuits and un-used column circuits.

10. An imager as in claim 4, wherein each selection circuit further comprises a shift register for controlling operation of a respective multiplexer.

11. An imager as in claim 1, wherein each of the column circuits comprises a sample and hold circuit for sampling and holding a reset signal and a photo signal from an imaging pixel.

12. An imager as in claim 11, further comprising a respective output circuit associated with each column circuit for selectively providing an output from the associated column circuit to a common output line under control of the control circuit.

13. An imager as in claim 12, wherein the control circuit does not selectively provide an output from a bypassed column circuit to the common output line.

14. An imager as in claim 1, wherein the column circuits are individually addressable and the control circuit includes a column counter logic circuit which supplies column circuit addresses to the column circuits and skips addresses stored in the storage device.

15. An imager as in claim 1, wherein the imager is part of a camera.

16. An imager comprising:
    a pixel array containing a plurality of imaging pixels arranged in rows and columns;
    a plurality of column circuits, each column circuit being connectable to a plurality of imaging pixels in a row;
    a plurality of row circuits, each row circuit being capable of addressing more than one row of the pixel array;
    a storage device for storing addresses of column circuits and row circuits which should be bypassed; and
    a control circuit for operating the plurality of column circuits and plurality of row circuits such that column circuits and row circuits having addresses stated in the storage device are not used during operation of the pixel array.

17. An imager as in claim 16, wherein the column circuits are individually addressable and the control circuit does not address column circuits having an address stored in the storage device.

18. An imager as in claim 16, wherein the row circuits are addressable and the control circuit does not address row circuits having an address stored in the storage device.

19. An imager as in claim 17, wherein the control circuit includes a column counter logic circuit which supplies column addresses to the column circuits and which skips column addresses corresponding to column circuits which have addresses stored in the storage device.

20. An imager as in claim 18, wherein the control circuit includes a row counter logic circuit which supplies row circuit addresses to the row circuits and which skips row addresses corresponding the row circuits which have addresses stored in the storage device.

21. An imager as in claim 16, wherein the imager is part of a camera.

22. An imaging device, comprising:
a pixel array, comprising a plurality of pixels arranged into N columns and a plurality of rows;
M column circuits, each of the M column circuits being switchably connectable to more than one of the N columns of pixels, each of the M column circuits including:
a selection circuit configured to switchably connect the column circuit to one of the more than one of the N columns of pixels,
a sample and hold circuit configured to receive signals from the connected one of the N columns of pixels, and
an output circuit configured to output a representation of the received signals to an output line of the column circuit, wherein M is greater than N, and N is greater than 1.

23. An imaging device as in claim 22, further comprising an analog to digital converter coupled to receive signals from an output line of a column circuit.

24. An imaging device as in claim 23, wherein the analog to digital converter is coupled to receive signals from output lines of a plurality of column circuits.

25. An imaging device as in claim 22, further comprising a control circuit for controlling the selection circuit of a column circuit.

26. An imaging device as in claim 25, further comprising M column decoders respectively coupled between the control circuit and one of the M column circuits.

27. An imaging device as in claim 26, wherein the control circuit selects a column decoder corresponding to a selected column circuit.

28. An imaging device as in claim 27, further comprising a storage device for storing addresses of column circuits which should not be used during operation of the imaging device, the control circuit operating to only select column circuits which do not have addresses stored in the storage device.

29. An imaging device as in claim 22, wherein each selection circuit comprises a multiplexer having inputs coupled to the more than one of the N columns of pixels and an output coupled to a sample and hold circuit.

* * * * *